United States Patent [19]
Weber

[11] Patent Number: 6,105,370
[45] Date of Patent: Aug. 22, 2000

[54] METHOD AND APPARATUS FOR REJECTING WASTE HEAT FROM A SYSTEM INCLUDING A COMBUSTION ENGINE

[75] Inventor: Kent Weber, Rockford, Ill.

[73] Assignee: Hamilton Sundstrand Corporation, Windsor Locks, Conn.

[21] Appl. No.: 09/135,925

[22] Filed: Aug. 18, 1998

[51] Int. Cl.[7] .................................................... F02C 1/00
[52] U.S. Cl. ................................ 60/733; 60/260; 60/736
[58] Field of Search ............................ 60/260, 266, 267, 60/736, 733

[56] References Cited

U.S. PATENT DOCUMENTS

| | | |
|---|---|---|
| 3,307,355 | 3/1967 | Bahr . |
| 3,775,976 | 12/1973 | Karig . |
| 4,238,925 | 12/1980 | Lowther . |
| 5,626,019 | 5/1997 | Shimizu et al. ........................... 60/736 |
| 5,845,481 | 12/1998 | Briesch et al. ............................ 60/736 |

FOREIGN PATENT DOCUMENTS 0693884  7/1994  Japan .

*Primary Examiner*—Noah P. Kamen
*Attorney, Agent, or Firm*—Wood, Phillips, VanSanten, Clark & Mortimer

[57] ABSTRACT

A method and apparatus are provided for rejecting waste heat (12) from a system (10) including a combustion engine (14), an oxidizer supply (16), and a fuel supply (18). The method includes the steps of providing a fuel flow (32) from the fuel supply (18), providing an oxidizer flow (30) from the oxidizer supply (16), splitting one of the fuel flow and the oxidizer flow into cooling flow (34) and a combustion flow (36), rejecting system waste heat (12) to the cooling flow (34), combusting the combustion flow (36) with the other of the fuel flow (32) and the oxidizer flow (30) to supply combustion gas for the combustion engine (14), and directing the cooling flow (34) into the combustion gas to reduce the temperature of the combustion gas.

11 Claims, 2 Drawing Sheets

METHOD AND APPARATUS FOR REJECTING WASTE HEAT FROM A SYSTEM INCLUDING A COMBUSTION ENGINE

FIELD OF THE INVENTION

This invention generally relates to the art of combustion engines and more particularly, to fuel control and thermal management in systems including a combustion engine.

BACKGROUND OF THE INVENTION

All systems that include a combustion engine generate waste heat during operation which must somehow be rejected from the system. In some systems, such as for example high speed aircraft or space vehicles, it is difficult or impossible to reject the waste heat to ambient air. To overcome this problem, some systems employ elaborate cooling devices, such as water boilers, for waste heat rejection from the combustion engine and its loads. Such devices are often undesirable because of factors, such as added complexity, cost, system volume, and/or weight.

Another problem, unrelated to waste heat rejection, is fuel control in combustion engines that use an oxidizer or fuel that is stored in a liquid phase and which vaporizes as it travels to the combustor. For example, it is common for gas turbine auxiliary power units on high speed aircraft and space vehicles to utilize a gaseous oxidizer that is compressed and cooled and stored in an oxidizer supply tank in the form of a liquid for purposes of reducing the storage volume. One problem with such systems is that under certain conditions, such as at start-up, the oxidizer flow to the flow control valve and combustor may be a mixture of gas and liquid, and not entirely vaporized. This produces unacceptable variability in the mass flow rate of the oxidizer to the combustor because the mass flow rate of gaseous oxidizer is very different than the mass flow rate of liquid oxidizer when passing through the same control valve flow area. The variability this creates in the mixture ratio of the oxidizer and fuel can result in combustion temperatures that vary greatly, which can produce either flame out due to insufficient oxidizer or burn out due to too much oxidizer.

SUMMARY OF THE INVENTION

It is a principal object of the invention to provide a new and improved method and apparatus for rejecting waste heat from a system including a combustion engine, an oxidizer supply for the combustion engine, and a fuel supply for the combustion engine. It is another object of the invention to provide a new and improved method and apparatus for controlling the mass flow rates of the combustion reactants to a combustion engine in a system using a combustion reactant that is stored in its liquid state and vaporized prior to combustion. One or more of these improvements are achieved in a method including the steps of providing a fuel flow from the fuel supply, providing an oxidizer flow from the oxidizer supply, splitting one of the fuel flow and the oxidizer flow into a cooling flow and a combustion flow, rejecting system waste heat to the cooling flow, combusting the combustion flow with the other of the fuel flow and the oxidizer flow to supply combustion gas for the combustion engine, and directing the cooling flow into the combustion gas to reduce the temperature of the combustion gas.

According to one aspect of the invention, the method further includes the step of rejecting heat from the one of the fuel flow and the oxidizer flow to the other of the fuel flow and the oxidizer flow prior to the splitting step.

According to another aspect of the invention, the step of rejecting heat from the one of the fuel flow and the oxidizer flow further comprises the step of vaporizing the other of the fuel flow and the oxidizer flow.

According to a further aspect of the invention, the method further includes the step of maintaining a preset proportionality between the cooling flow, the combustion flow, and the other of the fuel flow and the oxidizer flow.

In accordance with one aspect of the invention, an improvement is provided in a system producing waste heat and including a combustion engine, an oxidizer supply, and a fuel supply. The improvement includes a flow divider, a waste heat/cooling flow heat exchanger, and a combustor. The flow divider is downstream of one of the oxidizer supply and the fuel supply to receive a flow therefrom and to divide the flow into at least a cooling flow and a combustion flow. The waste heat/cooling flow heat exchanger is downstream of the flow divider to receive the cooling flow therefrom to reject system waste heat to the cooling flow. The combustor is downstream from: a) the other of the oxidizer supply and the fuel supply to receive a flow therefrom; b) the flow divider to receive the combustion flow therefrom; and c) the waste heat/cooling flow heat exchanger to receive the cooling flow therefrom.

According to one aspect of the invention, the improvement further includes an oxidizer/fuel heat exchanger upstream from the combustor to receive a fuel flow from the fuel supply and an oxidizer flow from the oxidizer supply to transfer heat between the fuel flow and the oxidizer flow.

According to another aspect of the invention, the oxidizer/fuel heat exchanger is upstream of the flow divider.

According to another aspect of the invention, the improvement further includes first, second and third flow control valves. The first flow control valve is upstream of the combustor and receives the flow from the other of the oxidizer flow and the fuel flow to control its flow rate to the combustor. The second flow control valve is upstream of the combustor and receives the combustion flow to control its flow rate to the combustor. The third flow control valve is upstream of the combustor and receives the cooling flow to control its flow rate to the combustor. The first, second and third control valves are mechanically linked to maintain a preset proportionality between the cooling flow, the combustion flow, and the flow from the other of the oxidizer and the fuel flow.

Other objects and advantages will become apparent from the following specification taken in connection with the accompanying drawings.

DETAILED DESCRIPTION OF THE PREFERRED EMBODIMENTS

Figure 1:
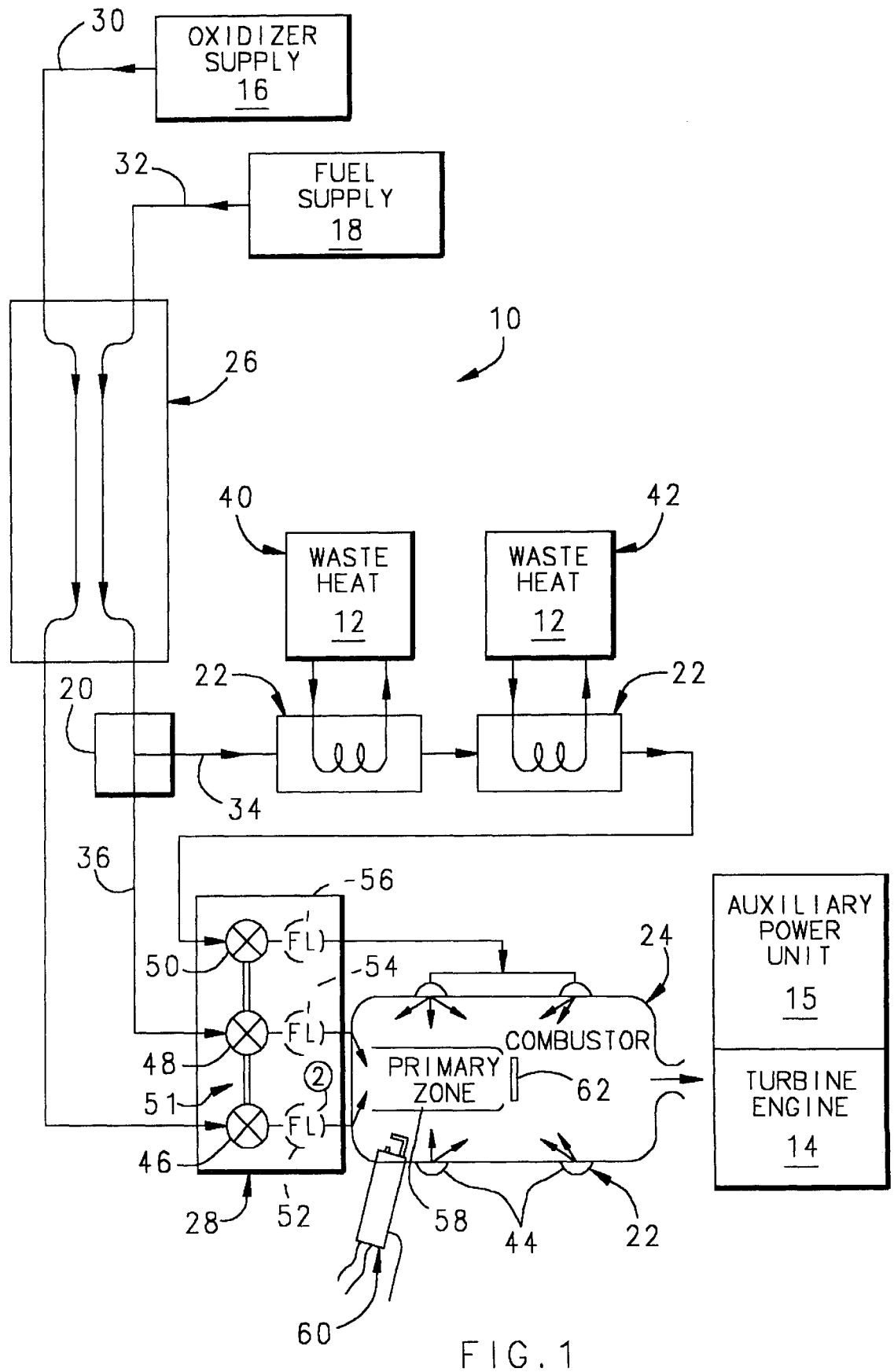
FIG. 1 is a diagrammatic illustration of a fuel control and waste heat rejection system embodying the present invention.

With reference to FIG. 1, the invention is an improvement in a system 10 that produces waste heat 12 and includes a combustion engine 14 (shown in the form of a turbine engine of an auxiliary power unit (APU) 15, such as is used in aircraft and space vehicles), an oxidizer supply 16, and a fuel supply 18. The preferred embodiment of the improvement includes a flow divider 20 waste heat/cooling flow heat exchangers 22. a combustor 24, an oxidizer/fuel heat exchanger 26. and a flow control package 28. While the improvement is described and illustrated in connection with the auxiliary power unit 15 it should be understood that the invention may find utility in other applications, and that no limitation to use with a gas turbine engine, an aircraft, or a space vehicle are intended except insofar as expressly stated in the appended claims.

The oxidizer supply 16 supplies an oxidizer flow 30 in the form of a liquid oxidizer, such as liquid oxygen stored under cryogenic conditions, that tends to vaporize on its way to the flow control package 28 and the combustor 24. The fuel supply 18 supplies a fuel flow 32 in the form of liquid fuel, such as liquid alcohol stored at ambient or room temperatures, which does not have a tendency to vaporize on the way to the combustor 24. The flows 30,32 are directed to the various components 20,22,24,26,28 by flow lines or other suitable apparatus, many types of which are well known in the art. As will be described in more detail below, there is an excess in the mass flow rate of the fuel flow 32 relative to the mass flow rate of the oxidizer flow 30 such that the combustor 24 operates at non-stoichiometric conditions.

The oxidizer/fuel heat exchanger 26 uses the sensible heat of the fuel flow 32 to vaporize and warm the oxidizer flow 30. Typically, the mass flow rate of the oxidizer flow 30 is relatively low, as is its heat of vaporization and specific heat, whereas the mass flow rate of the fuel flow 32 is relatively large, as is its specific heat. Preferably the heat exchanger 26 is designed such that the outlet temperatures of the oxidizer flow 30 and fuel flow 32 will be approximately equal and well above the freezing point of the fuel flow 32. For example, in the case of a liquid oxygen oxidizer flow 30 and liquid alcohol fuel flow 32 into the heat exchanger 26 and a vaporized oxygen oxidizer flow 30 and liquid alcohol fuel flow 32 out of the heat exchanger 26, it is preferred that the outlet temperature of both flows 30 and 32 be around 0° F., a temperature well above the freezing point of alcohol as well as the vaporizing temperature of liquid oxygen at the pressures of concern. The heat exchanger 26 may be of any suitable construction for the specific type of oxidizer and fuel utilized by the system. For example, in the case of a liquid oxygen flow 30 and liquid alcohol flow 32 into the heat exchanger 26, the heat exchanger 26 may simply be lengths of the supply lines for the oxidizer flow 30 and fuel flow 32, carefully co-located to prevent freeze-up.

In FIG. 1, the flow divider 20 is shown located downstream from the fuel supply 18 and the heat exchanger 26 to receive the fuel flow 32 therefrom and to divide the flow 32 into at least a cooling flow 34 and a combustion flow 36. The flow divider 20 may be provided in any suitable form, such as a flow splitting valve or a simple T fitting.

The waste heat/cooling flow heat exchangers 22 are located downstream from the flow divider 20 to receive the cooling flow 34 therefrom to reject the system waste heat 12 to the cooling flow 34. For purposes of illustration, three heat exchangers 22 are shown. One of the heat exchangers 22 rejects the waste heat 12 from the lubrication system 40 of the APU 15. Another of the heat exchangers 22 rejects waste heat 12 from a hydraulic system 42 that is one of the loads of the APU 15. The third heat exchanger 22 is in the form of a cooling flow manifold 44 that rejects waste heat 12 from the combustor 24 to the cooling flow 34 and directs the cooling flow 34 into the combustor 24. While a plurality of heat exchangers 22 are shown for illustration, it should be understood that more heat exchangers 22 or a single heat exchanger 22 may be provided depending on the specific requirements of the system 10 into which the improvement is incorporated.

The combustor 24 and flow control package 28 are located downstream from the oxidizer supply 16 and the heat exchanger 26 to receive the vaporized oxidizer flow 30 therefrom. The combustor 24 and flow control package 28 are also located downstream from the flow divider 20 to receive the combustion flow 36 therefrom, and downstream from the waste heat/cooling flow heat exchanger 22 to receive the cooling flow 34 therefrom.

The flow control package 28 contains three flow control valves 46, 48 and 50, with the valve 46 controlling the mass flow rate of the oxidizer flow 30, the valve 48 controlling the mass flow rate of the combustion flow 36, and the valve 50 controlling the mass flow rate of the cooling flow 34. In one preferred embodiment, valves 46,48,50 have flow orifice areas which can be varied to adjust the mass flow rates of their respective flows 30,36,34 in response to control signals from the system 10. Such valves are well known and need not be described in further detail. However, one unique feature is that the valves 46,48,50 are mechanically linked, as shown at 51, so as to maintain a preset proportionality between the mass flow rates of the cooling flow 34, the combustion flow 36, and the oxidizer flow 30 so as to maintain the desired mixture ratios in the combustor. In another preferred embodiment, the valves 46,48,50 are mechanically linked, "bang-bang" flow control valves which are all either simultaneously fully opened or fully closed. Again, such valves are well known and need not be described further herein. In this embodiment, as shown in phantom, flow limiters 52,54,56 are preferably provided for each of the valves 46,48,50 to limit the respective mass flow rates of the flows 30,36,34 when the "bang-bang" valves 46,48,50 are in their fully opened position. The flow limiters 52,54,56 may take any suitable form, such as a sonic venturi for the vaporized oxidizer flow 30 and cavitating verturi or mechanical flow limiters for the liquid fuel flows 34 and 36. Again, such flow limiters are well known and need not be described further herein. While it is preferred that the flow limiters 52,54,56 are located downstream from the valves 46,48,50, it should be understood that the flow limiters 52,54,56 may be located at any suitable position upstream of the flow control package 28. Thus, for example, the flow limiter 52 could be located immediately downstream from the heater exchanger 26, while the flow limiters 54 and 56 could be located immediately downstream or integral with the flow divider 20. In this regard, it should be noted that the flow limiter 52 for the oxidizer flow 30 is preferably located at a point in the system where the entire oxidizer flow 30 has been vaporized.

The combustor 24 includes injectors (not shown) or other suitable apparatus for directing the oxidizer flow 30 and combustion flow 36 into a primary combustion zone 58 of the combustor 24. An igniter 60 or other suitable apparatus is provided in the combustor 24 to ignite the combustion reactance in response to control signals from the system 10. In the embodiment where the valves 46,48,50 are provided in the form of "bang-bang" valves, a hot surface 62 is provided in the combustor adjacent the primary zone 58 to provide re-ignition for each pulse of the combustion flow 36 and oxidizer flow 30. As discussed earlier, the combustor 24 also includes a cooling flow manifold 44 that directs the cooling flow 34 across the walls of the combustor 24 and into the combustor 24 downstream of the primary combustion zone 58 to mix with and vaporize in the gases of combustion to further cool the combustion gases.

In operation. the flow control package 28 maintains a proportionality between the mass flow rate of the combustion flow 36 and the oxidizer flow 30 to provide a combustion reaction that produces a relatively hot, reliably ignited flame in the primary zone 58 of the combustor 24. The flow control package 28 maintains the proportionality of the cooling flow 34 relative to the combustion flow 36 and oxidizer flow 30 so that the cooling flow 34 can be injected into the combustor 24 via the manifold 44 to act as a cooling diluent flow to keep the walls of the combustor 24 cool and to reduce the temperature of the combustion gas to acceptable levels for reliable operation of the turbine engine 14. Because the heat exchanger 26 ensures that the entire oxidizer flow 30 is vaporized, a reliable mass flow rate of the oxidizer flow can be obtained through the valve 48 and the flow control package 28. Further, in many systems, the oxidizer flow 30 and the fuel flow 32 will have ample heat capacity to absorb all of the waste heat 12 of the APU 15 and a considerable fraction of the waste heat 12 of the APU loads. Because the waste heat 12 is introduced to the cooling flow 34, rather than to the combustion flow 36, the temperature of the combustion flow 36 will not vary with changes in the amount of waste heat 12 rejected from the system 10 and the mixture ratio of the combustion flow 36 and the oxidizer flow 30 can thus be maintained as desired. While the temperature of the cooling flow 34 will vary with changes in the amount of waste heat 12 rejected from the system 10, the resulting variation in the combustion gas outlet temperature from the combustor 24 are acceptable in comparison to the exceptionally high local temperatures that can occur with incorrect mixture ratios in the primary zone 58.

Figure 2:
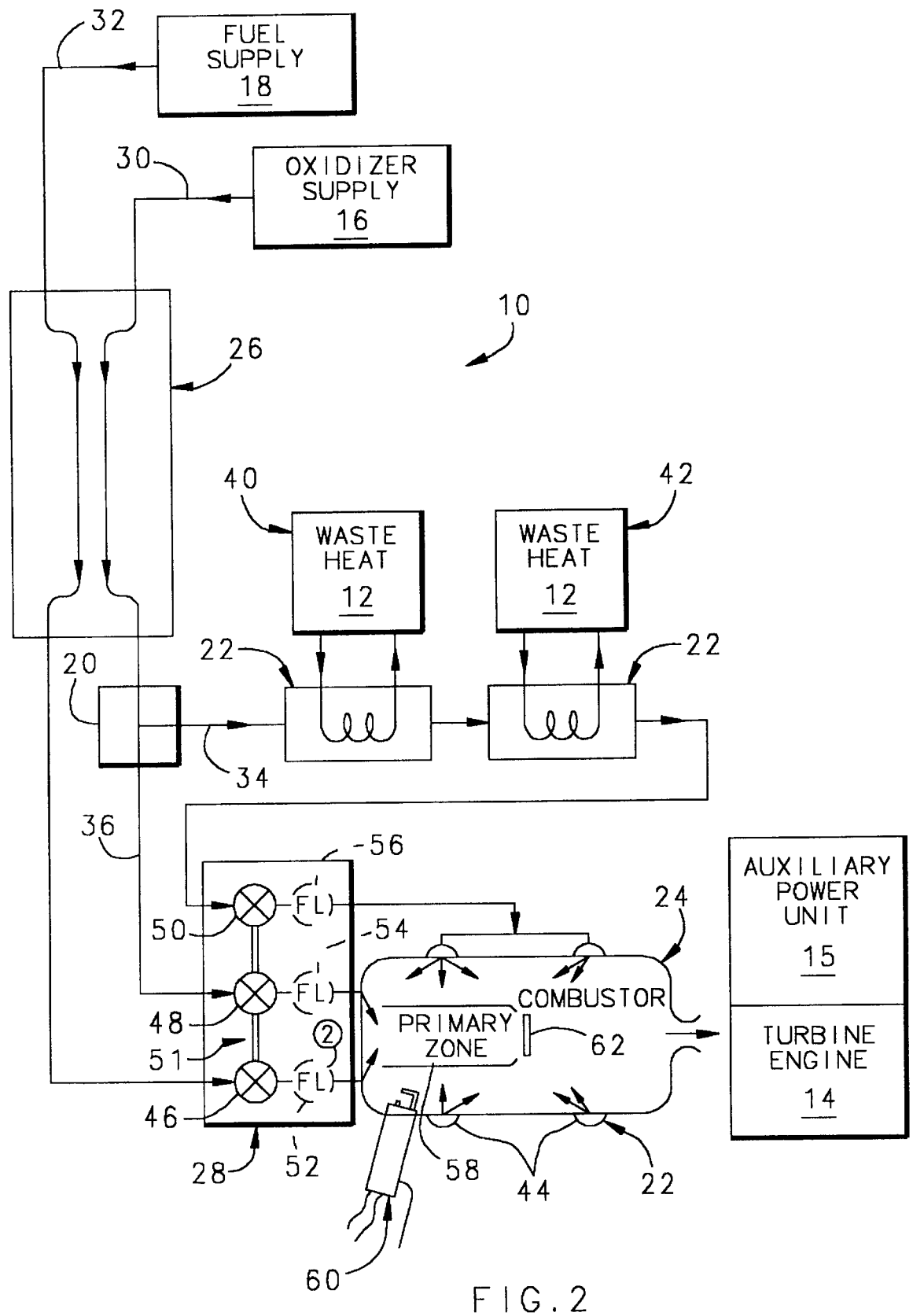
FIG. 2 is a diagrammatic illustration similar to FIG. 1 but illustrating a modified embodiment of the fuel control and waste heat rejection system.

It should be understood that while the invention has been described in terms of an excess mass flow rate for the fuel flow 32, the invention may also be practiced with an excess mass flow rate of the oxidizer flow 30, rather than the fuel flow 32, such as is shown in FIG. 2. wherein the oxidizer flow 30 is split into the cooling flow 34 and combustion flow 36, and the fuel flow 32 is controlled by the valve 46.

It should also be understood that, depending upon the specific types of fuel and oxidizer, it may desirable in some systems for the heat to be rejected from the oxidizer flow 30 to the fuel flow 32, rather than from the fuel flow 32 to the oxidizer flow 30.

It should also be understood that in some systems, there will be no need to vaporize either the oxidizer flow 30 or the fuel flow 32, nor any need to rely on the combined heat capacity of the two flows 30 and 32 for absorbing the waste heat 12 of the system. In such cases, the heat exchanger 26 can be eliminated, and the heat capacity of one of the flows 30 and 32 can be relied upon to absorb the waste heat 12.

What is claimed is:

1. A method for rejecting waste heat from a system including a combustion engine, an oxidizer supply for the combustion engine, and a fuel supply for the combustion engine, the method comprising the steps of:

providing a fuel flow from the fuel supply;

providing an oxidizer flow from the oxidizer supply;

splitting one of the fuel flow and the oxidizer flow into a cooling flow and a combustion flow;

rejecting system waste heat to the cooling flow;

combusting the combustion flow with the other of the fuel flow and the oxidizer flow to supply combustion gas for the combustion engine; and mixing the cooling flow into the combustion gas to reduce the temperature of the combustion gas.

2. The method of claim 1 further comprising the step of rejecting heat from the one of the fuel flow and the oxidizer flow to the other of the fuel flow and the oxidizer flow prior to the splitting step.

3. The method of claim 2 further comprising the step of providing the other of the fuel flow and the oxidizer flow in the form of a flow of liquid, and wherein the step of rejecting heat from the one of the fuel flow and oxidizer flow further comprises the step of vaporizing the other of the fuel flow and the oxidizer flow.

4. The method of claim 1 further comprising the step of maintaining a preset proportionality between the cooling flow, the combustion flow, and the other of the fuel flow and the oxidizer flow.

5. A method for rejecting waste heat from a system including a combustion engine, an oxidizer supply for the combustion engine, and a fuel supply for the combustion engine, the method comprising the steps of:

providing a fuel flow from the fuel supply;

providing an oxidizer flow from the oxidizer supply;

splitting the fuel flow into a cooling flow and a combustion flow;

rejecting system waste heat to the cooling flow;

combusting the combustion flow with the oxidizer flow to supply combustion gas for the combustion engine; and mixing the cooling flow into the combustion gas to reduce the temperature of the combustion gas.

6. The method of claim 5 further comprising the step of rejecting heat from the fuel flow to the oxidizer flow prior to the splitting step.

7. The method of claim 6 wherein the step of providing an oxidizer flow from the oxidizer supply comprises the step of providing the oxidizer flow in the form of a liquid oxidizer flow from the oxidizer supply, and the step of rejecting heat from the fuel flow further comprises the step of vaporizing the oxidizer flow.

8. The method of claim 5 further comprising the step of maintaining a preset proportionality between the cooling flow, the combustion flow, and the oxidizer flow.

9. In a system producing waste heat and including a combustion engine, an oxidizer supply, and a fuel supply, the improvement comprising:

a flow divider downstream from one of the oxidizer supply in the fuel supply to receive a flow therefrom and to divide the flow into at least a cooling flow and a combustion flow;

a waste heat/cooling flow heat exchanger downstream from the flow divider to receive the cooling flow therefrom to reject system waste heat to the cooling flow; and a combustor for the combustion engine downstream from;
   a) the other of the oxidizer supply and the fuel supply to receive a flow therefrom;
   b) the flow divider to receive the combustion flow from the flow divider; and
   c) the waste heat/cooling flow heat exchanger to receive the cooling flow from the waste heat/cooling flow heat exchanger;

a first flow control valve upstream of the combustor receiving the flow from the other of the oxidizer flow and the field flow to control its flow rate to the combustor;

a second flow control valve upstream of the combustor receiving the combustion flow to control its flow rate to the combustor; and a third flow control valve upstream of the combustor receiving the cooling flow to control its flow rate to the combustor;

the first, second, and third control valves being mechanically linked to maintain a preset proportionality between the cooling flow, the combustion flow and the flow from the other of the oxidizer and the field flow.

10. In a system producing waste heat and including a combustion engine, an oxidizer supply, and a fuel supply, the improvement comprising:

an oxidizer/fuel heat exchanger receiving a fuel flow from the fuel supply and an oxidizer flow from the oxidizer supply to transfer heat between the fuel flow and the oxidizer flow;

a flow divider downstream of the oxidizer/fuel heat exchanger to receive the fuel flow therefrom and to divide the fuel flow into a cooling flow and a combustion flow;

a waste heat/fuel heat exchanger downstream from the oxidizer/fuel heat exchanger to receive the cooling flow therefrom to reject system waste heat to the cooling flow; and a combustor for the combustion engine downstream from a) the oxidizer/fuel heat exchanger to receive the oxidizer flow and the combustion flow therefrom and b) the waste heat/fuel heat exchanger to receive the cooling flow therefrom.

11. The improvement of claim 10 further comprising:

a first flow control valve upstream of the combustor receiving the oxidizer flow to control the rate of the oxidizer flow to the combustor;

a second flow control valve upstream of the combustor receiving the combustion flow to control the rate of the combustion flow to the combustor; and a third flow control valve upstream of the combustor receiving the cooling flow to control the rate of the cooling flow to the combustor;

the first, second, and third control valves being mechanically linked to maintain a preset proportionality between the oxidizer flow, the combustion flow and the cooling flow.

* * * * *